United States Patent
McNulty et al.

(10) Patent No.: US 7,469,337 B2
(45) Date of Patent: *Dec. 23, 2008

(54) SYSTEM AND METHOD FOR COMPUTER STORAGE SECURITY

(75) Inventors: Stephen Anthony McNulty, Elmont, NY (US); John Christopher Lallier, Massapequa Park, NY (US); Harry John Gosden, Long Beach, NY (US)

(73) Assignee: FalconStar, Inc., Melville, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 11/503,836

(22) Filed: Aug. 14, 2006

(65) Prior Publication Data

US 2006/0277419 A1    Dec. 7, 2006

Related U.S. Application Data

(63) Continuation of application No. 09/925,976, filed on Aug. 9, 2001, now Pat. No. 7,093,127.

(51) Int. Cl.
H04L 9/32 (2006.01)

(52) U.S. Cl. .......................................... 713/168; 726/2
(58) Field of Classification Search .................. 713/168
See application file for complete search history.

(56) References Cited

U.S. PATENT DOCUMENTS

| | | | | |
|---|---|---|---|---|
| 5,151,987 A * | 9/1992 | Abraham et al. | | 714/20 |
| 5,206,946 A * | 4/1993 | Brunk | | 710/2 |
| 5,237,695 A * | 8/1993 | Skokan et al. | | 709/225 |
| 5,274,783 A * | 12/1993 | House et al. | | 710/300 |
| 5,287,537 A * | 2/1994 | Newmark et al. | | 712/29 |
| 5,325,527 A * | 6/1994 | Cwikowski et al. | | 709/222 |
| 5,333,277 A * | 7/1994 | Searls | | 710/300 |
| 5,338,243 A * | 8/1994 | Kieves | | 446/220 |
| 5,463,772 A * | 10/1995 | Thompson et al. | | 707/101 |
| 5,471,634 A * | 11/1995 | Giorgio et al. | | 707/104.1 |
| 5,491,812 A * | 2/1996 | Pisello et al. | | 709/236 |
| 5,504,757 A * | 4/1996 | Cook et al. | | 370/468 |
| 5,524,175 A * | 6/1996 | Sato et al. | | 706/41 |
| 5,528,765 A * | 6/1996 | Milligan | | 710/107 |
| 5,548,731 A * | 8/1996 | Chang et al. | | 710/100 |

(Continued)

OTHER PUBLICATIONS

"SCSI-adapter for hard disks. Part 3,: BIOS," Klien, R.-D, Thiel, T., Mikrocomputer Zeitschrift No. 12, pp. 88-98, 102-5, publ. Dec. 1989.*

(Continued)

*Primary Examiner*—Matthew B Smithers
(74) *Attorney, Agent, or Firm*—Brandon N. Sklar; Jonathan Tyler; Kaye Scholer, LLC

(57) ABSTRACT

A method to protect stored data is provided, comprising performing one or more times, by a processor, the following actions: receiving from a device verification information generated using common information known to the device and to the processor, verifying the validity of the verification information using the common information, determining an authorization status of the device based on (1) the validity of the verification information and (2) the time the verification information is received by the processor, and receiving a request from the device to access the stored data. The device is allowed to access the stored data based on the authorization status at the time the request is received.

18 Claims, 2 Drawing Sheets

U.S. PATENT DOCUMENTS

| | | | | | |
|---|---|---|---|---|---|
| 5,548,783 | A | * | 8/1996 | Jones et al. | 710/16 |
| 5,561,812 | A | * | 10/1996 | Ravaux et al. | 709/250 |
| 5,574,861 | A | * | 11/1996 | Lorvig et al. | 709/226 |
| 5,574,862 | A | * | 11/1996 | Marianetti, II | 710/100 |
| 5,596,723 | A | * | 1/1997 | Romohr | 709/222 |
| 5,613,160 | A | * | 3/1997 | Kraslavsky et al. | 710/16 |
| 5,640,541 | A | * | 6/1997 | Bartram et al. | 703/26 |
| 5,664,221 | A | * | 9/1997 | Amberg et al. | 710/9 |
| 5,787,019 | A | * | 7/1998 | Knight et al. | 719/324 |
| 5,819,054 | A | * | 10/1998 | Ninomiya et al. | 712/3 |
| 5,892,955 | A | * | 4/1999 | Ofer | 710/200 |
| 5,923,850 | A | * | 7/1999 | Barroux | 709/224 |
| 5,925,119 | A | * | 7/1999 | Maroney | 710/315 |
| 5,941,972 | A | * | 8/1999 | Hoese et al. | 710/315 |
| 5,991,813 | A | * | 11/1999 | Zarrow | 709/236 |
| 5,996,024 | A | * | 11/1999 | Blumenau | 719/326 |
| 6,003,065 | A | * | 12/1999 | Yan et al. | 709/201 |
| 6,041,381 | A | * | 3/2000 | Hoese | 710/315 |
| 7,093,127 | B2 | * | 8/2006 | McNulty et al. | 713/168 |

OTHER PUBLICATIONS

"General host interface for SCSI applications," Putnam, T., OPTICALINFO 89. The International Meeting for Optical Publishing and Storage, pp. 99-105, publ. Learned Information Oxford, UK, 1989.*

"Automatic Small Computer System Interface Termination Circuit for Narrow/Wide Devices on Wide Bus," IBM Technical Disclousre Bulletin, pp. 79-82, Apr. 1997.*

"Transparent Target Mode for a Small Computer System Interface," IBM Technical Disclosure Bulletin, pp. 161-164, Aug. 1990.*

"Automatic Target Mode for the Small Computer System Interface" IBM Technical Disclosure Bulletin, pp. 130-133, Oct, 1990.*

"Method Allowing Small Computer Interface Adapters to Coexist with Other Hardfile Adapters," IBM Technical Disclosure Bulletin, pp. 709-710, Sep. 1994.*

"Software Solution for Coordinating a Small Computer System Interface with Multiple Drives," IBM Technical Disclosure Bulletin, pp. 577-578, Jun. 1995.*

"Multi-Thread Sequencing in a Small Computer Interface Environment," IBM Technical Disclosure Bulletin, pp. 497-500, Sep. 1994.*

"SCSI Device Auto-Sensing for On-Board SCSI Interface Sub-System," IBM Technical Disclosure, pp. 395-396, Feb. 1994.*

"Small Computer System Interface ID Translation," IBM Technical Disclosure, pp. 125-126, Feb. 1994.*

"Single-Ended Device to Differential Small Computer System Interface Converter," IBM Technical Disclosure Bulletin, pp. 457-458, Dec. 1993.*

"SCSI Multiple Initiator," IBM Technical Bulletin, pp. 367-369, Sep. 1992.*

"Self Configuring Small Computer System Interface Device Driver," IBM Technical Disclosure Bulletin, pp. 135-142, Mar. 1995.*

"Multiple Small Computer System Interface Command Arrangement," IBM Technical Disclousre Bulletin, pp. 613-614, Jan. 1995.*

"Real-Time Performance for Small Computer System Interface Disk Arrays," IBM Technical Bulletin, pp. 33-34, Feb. 1996.*

"Managing Queue Full Status for Small Computer System Interface, Version 2," IBM Technical Disclosure Bulletin, pp. 247-2480 Jul. 1995.*

"Small Computer Systems Interface Identification Qualification During Selection/Deselection," IBM Technical Disclosure Bulletin, pp. 209-210, Dec 1990.*

"Suppress Illegal Length Indication on the Small Computer System Interface While Still Detecting Length Errors," IBM Technical Disclosure Bulletin, pp. 316-318, Mar. 1990.*

"SCSI-3 Generic Packetized Protocol (SCSI-GPP)," Information Processing Systems Technical (Rev 9, Jan. 12, 1995) publ. 1997 by American National Standards Institute.*

"XDR: External Data Representation Standard," Network Working Group, RFC 1014, Sun Microsystems, Inc., Jun. 1987 (http://rfc.net/rfcl014.html).*

"Information Technology-SCSI Architecture Model-2 (SAM-2)," T 10 Technical Committee, NCITS, Project 1157-D, Revision 14 (Working Draft), Sep. 17, 2000, Distributed by Global Engineering Documents, Englewood, CO.*

"Network-attached peripherals (NAP) for HPSS/SIOF," Lawrence Livermore National Laboratory, Oct. 1995 (www.llnl.gov/liv_comp/siof_nap.html).*

"ATOMIC: A Local Communication Network Created Through Repeated Application of Vlulticomputing Components," Cohen, Danny, Gregory Finn, Robert Felderman, Annette DeSchon, University of Southern California/Information Sciences Institute, Oct. 1992.*

"An Integration of Network Communication with Workstation Architecture," Finn, Gregory G. USC/Information Sciences Institute, Oct. 1991, ACM Computer Communication Review.*

"ATOMIC: A Low-Cost, Very-High-Speed LAN," Cohen, Danny, Gregory Finn, Robert Felderman, Annette DeSchon, USC/Information Sciences Institute (no date of publ.)(probably before 1995).*

"Interfacing High-Definition Displays via the Internet," Finn, Gregory G., Rod Van Meter, Steve Jotz, Bruce Parham, USC/Information Sciences Institute, Aug. 1995.*

"Netstation Architecture Multi-Gigabit Workstation Network Fabric," Finn, Gregory G., Paul Mockapetris, USC/Information Sciences Institute (no date)(probably before 1995).*

"Netstation Architecture Gigabit Communication Fabric," Finn, G. G., USC/Information Sciences Institute, University of Southern California, Apr. 1994, (slidechart/diagrams).*

"The Use of Message-Baseed Multicomputer Components to Construct Gigabit Networks," Cohen Danny, Gregory G. Finn, Robert Felderman and Annette DeSchon, USC/Information Sciences Institute, Jun. 1992.*

"Transoft polished SCSI-Net hub; Stalker Ships SCSI-Sharin~: Tool," by Nathalie Welch, MacWeek, Aug. 22, 1994 (News section).*

"SCSIShare/Share that Scanner," p. 71, Nov. 1995, MacUser.*

"Stalker Software Announces an Update and a Free Demo of Their Popular SCSIShare Software," by Larry Allen, Mac Mania News, Jul. 30, 1998.*

"IP Storage (ips)," IETF, (updated as of Oct. 2000)(www.ietf.org/html.charters/ips-charter.html).*

"Encapsulating IP with the Small Computer System Interface," Elliston, B., Computer Research Network Working Group, RFC 2143, May 1997 (http://rfc.net/rfc2143.html).*

"Encapsulating IP Using SCSI," Elliston, Ben, Linux Journal, Aug. 1998 (www2.1inuxjournal.com/lj-issues/issues/issues52/2344.html).*

"IP Encapsulation in SCSI Driver," Scott, Randy, Chris Frantz and Alan Bork, Feb. 1997 (www.msoe.edu/~sebern/courses/cs400/teamlfinal/index.htm).*

"Networking CD-ROMs-The Power of Shared Access," Perratore, Ed. PC Magazine, Dec. 31, 1991, pp. 333-363.*

* cited by examiner

SYSTEM AND METHOD FOR COMPUTER STORAGE SECURITY

The present application is a continuation of application Ser. No. 09/925,976 filed on Aug. 9, 2001, now U.S. Pat. No. 7,093,127, which is assigned to the assignee of the present application and incorporated by reference herein.

BACKGROUND OF THE INVENTION

This invention relates generally to a system and a method for protecting computer storage systems from being accessed by unauthorized computers. More particularly, this invention relates to a system and a method that provides for periodic verification of computers sending and receiving data to and from storage devices, storage servers, or storage systems over a computer network.

Traditionally, computers store data on storage devices, which can be located internally or externally to a computer enclosure. Computers may have access to many storage devices, servers, or systems, some of which are internal and some of which are external. When a storage device is accessed by a computer located within the same enclosure, there is little or no risk of unauthorized access of the stored data by another computer, because the data are not transmitted over a computer network. This configuration provides good security because no other computer can read the data, but does not provide the ability for other computers to directly utilize the same storage device. When a storage device is implemented into a storage area network (SAN), there is an increased risk of unauthorized access of the stored data. The increased risk is caused by the storage device being directly or indirectly connected to many computers over a computer network, such as the Internet, local area networks (LANs), metropolitan area networks (MANs), or wide area networks (WANs).

In a storage area network or similar type of network, there will be more than one computer that can have direct access to one or more storage devices. There may also be more than one storage device and the storage device may be controlled by a computer. Because the primary purpose of storage systems is to provide storage, they are typically not equipped with security systems. The computers are connected to the storage systems, storage devices, and servers by a network, which may be large and accessed by many authorized and unauthorized computers. In the case of SANs and other types of networks, there exists a need to provide a security system to prevent unauthorized access of the stored data.

Various techniques are available to prevent unauthorized access to computer data. The most common techniques are encryption and authentication protocols. Typically, encryption involves an initiating computer and a servicing computer with a shared secret key and complex algorithms used to encode the data using the shared secret key. Encryption considerably decreases data throughput and increases processing effort. Some encryption protocols required additional hardware to be used, adding to the expense of the system. Authentication handshaking protocols involve using a shared secret key to establish the communications link between an initiating computer and a servicing computer. Authentication alone does not provide periodic verification of the initiating computer's identity.

Spoofing is one type of unauthorized access to data in which an invading computer masquerades as the initiating computer after the initiating computer has established a communication link through the authentication protocol with the storage device. The invading computer is able to steal data from the storage device because the invading computer is able to forge its identity as a valid computer.

What is needed is a way to check for unauthorized access of a storage device or system and provides periodic verification of a computer during data transfer between the computer and the storage device or system, while not decreasing data throughput.

SUMMARY OF THE INVENTION

Deficiencies in the prior art are overcome, and an advance in the art is achieved with a method and a system that improves security of a computer network by requiring an initiating computer to periodically reaffirm its identity by transmitting a message, called a "heartbeat" message, to a servicing computer.

In an example of an embodiment of the invention, the method is carried out in a computer for providing periodic verification of the computer during requests from the computer to a second computer over a communications system. Operationally, the computer establishes an authentication handshake with the second computer and periodically sends messages to the second computer. The requests, which can be requests to send or receive data, are serviced if the messages are valid and are received within a predetermined time interval. The authentication handshake can include an exchange of a session key and a sequence value. The messages can include the session key and the sequence value, which are processed through a one-way hash function.

In one embodiment of the invention, a method to protect stored data is provided. The method comprises performing one or more times, by a processor, the following actions: receiving from a device verification information generated using common information known to the device and to the processor, verifying the validity of the verification information using the common information, determining an authorization status of the device based on (1) the validity of the verification information and (2) the time the verification information is received by the processor, and receiving a request from the device to access the stored data. The device is allowed to access the stored data based on the authorization status at the time the request is received.

The method may also comprise determining an authorization status of the device based on (1) the validity of the verification information and (2) whether the verification information is received during a predetermined time interval. The method may additionally include updating the common information, and instructing the device to update the common information.

In other examples, the method may comprise establishing an initial authorization status of the device based on a predefined authentication process. The common information may comprise a sequence value. The common information may further comprise a session key. The verification information may comprise a verification value.

In another example, the method may additionally comprise updating the sequence value according to a first predetermined algorithm to generate an updated value, applying a second predetermined algorithm to the updated value to generate an expected value, comparing the expected value to the verification value, and determining the verification value to be valid if the expected value is the same as the verification value. The first predetermined algorithm may comprise updating the stored value by a predetermined increment value. The second predetermined algorithm may comprise applying a hash function to the updated value and the session key to generate the expected value.

In another embodiment of the invention, a method to protect stored data is provided. The method comprise providing authentication information to a processor responsible for managing data processing requests relating to stored data. The method also comprises performing, at least once during one or more time intervals having predetermined durations, the following actions: retrieving from memory a value previously received from the processor, receiving an acknowledgment message from the processor; in response to the acknowledgment message, updating the value according to a first predetermined algorithm to generate an updated value, applying a second predetermined algorithm to the updated value to generate an encoded value, and transmitting the encoded value to the processor. The method further comprises transmitting to the processor at least one data processing request relating to the stored data.

The first predetermined algorithm may comprise updating the value by a predetermined increment value. The second predetermined algorithm may comprise encoding the updated value using a session key previously provided by the processor. The second predetermined algorithm may comprise a hash function.

DETAILED DESCRIPTION

The present invention improves security of a computer storage system, for example, a storage area network (SAN), by requiring an initiating computer to periodically reaffirm its identity by transmitting a message, called a "heartbeat message," to a servicing computer. The heartbeat message contains a previously established shared secret (for example, a session key) and a sequence value, established by and known only to the original participants. It should be realized that a heartbeat message can include other information. A heartbeat message must be received by the servicing computer within a predetermined time interval in order to maintain data communications between the original participants. It should also be realized that the period at which heartbeat messages are transmitted is independent of data transmissions.

Figure 1:
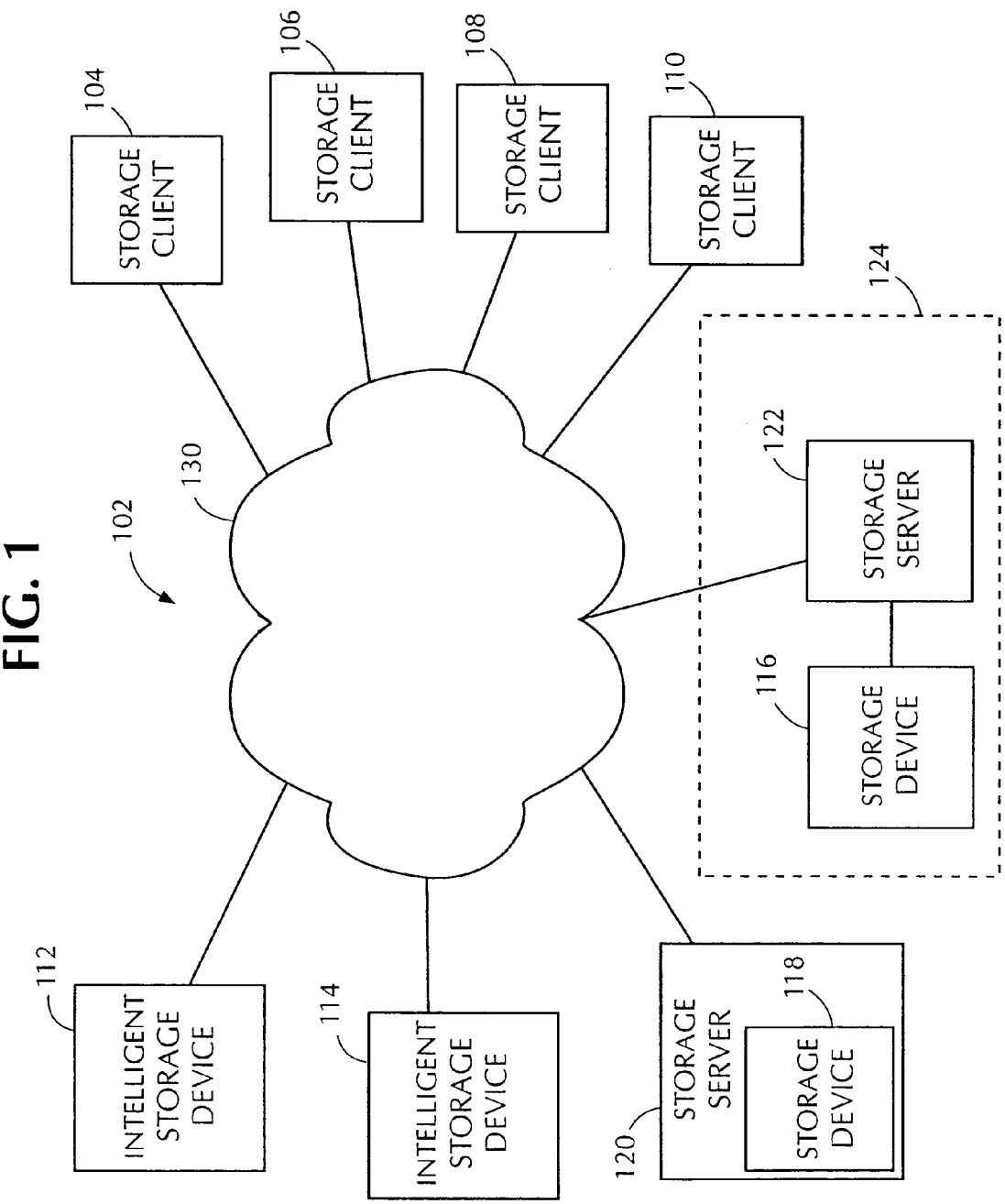
FIG. 1 presents a block diagram of an illustrative arrangement that embodies the principles of the invention.

FIG. 1 presents a general block diagram of an illustrative arrangement that embodies the principles of the invention. It shows a SAN 102, which includes computers called storage clients 104-110, intelligent storage devices 112, 114, storage devices 116, 118, and computers called storage servers 120, 122. Collectively, storage device 116 and storage server 122 make up a storage system 124. A communications system 130 interconnects storage clients 104-110, intelligent storage devices 112, 114, storage devices 116, 118, storage servers 120, 122, and storage system 124.

It may be noted that communications system 130 can include any type of network, such as the Internet, local area network (LAN), metropolitan area network (MAN), or wide area network (WAN), so long as the protocols are consistent with the communications protocols utilized by storage clients 104-110, storage devices 112-118, and storage servers 120, 122. Communications system 130 can also comprise various types of networks and topologies, as well as include a high-speed switch for communicating between the storage client computers and the storage server. Communications system 130 may require devices such as hubs, switches and host bus adapters (HBAs) depending on the type of system. Communications system 130 can utilize storage protocols such as Fibre Channel (FC) or Small Computer System Interface (SCSI). The SCSI protocol provides for the interface of personal computers to peripheral hardware, such as disk drives, tape drives, and CD-ROM drives.

The data paths can consist of any type of data cable or network used in the transmission of computer data including but not limited to SCSI and Fibre Channel. Fibre Channel is suited for connecting computers to shared storage devices and for interconnecting storage controllers and drives. Because Fibre Channel was created to transmit large blocks of data very quickly, it is a good transmission interface between computers and clustered storage devices.

The data paths can utilize any data/communications protocol, for example, SCSI or IP, or transmission medium, for example, electrical or optical media, available now or in the future to accomplish computer communications. There is no limitation on the type or format of computer communications, for example packet switched or non-packet switched modes, allowing for short distance, simple cable connection or world-wide, internet connection. As can be observed, the level of flexibility with the above communications system 130 and its communications protocols is almost limitless.

Storage clients 104-110 are computers, for example, personal computers, servers, workstations, or embedded systems, which may need to access data stored at one or more remotely located intelligent storage devices 112, 114, or servers 120, 122. Storage clients 104-110 can run on an operating system such as Microsoft's Windows® Operating System, Unix®, or NetWare®, to name a few. The computers are capable of communicating over the Internet, an intranet, and other networks.

Intelligent storage devices 112, 114 are devices that provide storage or data, and which may include a computer and/or network capabilities. These intelligent storage devices 112, 114 can be, for example, intelligent hard disks, RAID subsystems, intelligent tape drives, and intelligent CD-ROMs, which can be connected to communications system 130. Storage devices 116, 118 can also be hard disks, RAID subsystems, tape drives, and CD-ROMs included in storage server 120 or part of storage system 124.

Storage servers 120, 122 are computers, for example, personal computers, servers, workstations, or embedded systems, which are coupled to one or more storage devices, such as storage devices 116 or 118. These storage devices 116, 118 are situated so that the data communication paths from the storage devices pass through the corresponding storage servers 120, 122, before connecting to one or more storage clients 104-110.

A computer is any device that accepts information (in the form of digital data) and manipulates it for some result based on a program or sequence of instructions.

The present invention is embodied in software programs that provide improved security by requiring an initiating storage client to periodically reaffirm its identity by transmitting an additional message, called a heartbeat message, to a storage server. The software programs check for unauthorized access of storage devices 112-118 and provide periodic verification of storage clients 104-110 during data transfer (i.e., reading data and/or writing data) between storage clients 104-110 and storage devices 112-118, while not decreasing data throughput. Generally, there are two types of software programs in the present invention. The first type, called a "storage security agent" (SSAgent), is stored in storage clients 104-110, and the second type called a "storage security administrator" (SSAdmin) is stored in intelligent storage devices 112, 114 and storage servers 120-122. These software programs comprise computer-executable code (i.e., processing steps) stored in a computer readable medium, which includes any kind of computer memory such as floppy disks, hard disks, CD-ROMs, flash ROMs, nonvolatile ROM and RAM.

To illustrate, the SSAdmin is generally stored in a storage server or intelligent storage device, for example, storage server 122, and the SSAgent is stored in a storage client, for example, storage client 104. Generally, the SSAgent has two responsibilities, the first of which is to authenticate storage client 104 with storage server 122 and the second of which is to periodically provide a heartbeat signal. If the authentication is approved by storage server 122, then storage client 104 can start sending requests (e.g., reading data and/or writing data) to storage server 122 and storage server 122 can start servicing the requests.

The first responsibility, authentication, is a process in which an entity, such as storage client 104, must identify itself to a system, such as storage server 122, before services are provided to storage client 104. This process protects storage server 122 against unauthorized access and against counterfeit computers that may try to copy the identity of a real storage client in order to gain access to storage server 122. Key exchanges or passwords are commonly used to authenticate users.

The second responsibility of the SSAgent is to periodically provide a heartbeat message, while storage client 104 sends requests to storage server 122 and storage server 122 services the requests. The heartbeat message is provided periodically to avoid decreasing data throughput. The heartbeat message includes a predetermined sequence value and is sent within a predetermined time interval, to inform storage server 122 that storage client 104 is the storage client that storage server 122 authenticated, not an unauthorized computer. The sequence value can be any value comprising numbers and/or letters and is updated by the SSAgent in storage client 104 and by the SSAdmin in storage server 122 after each heartbeat message is sent. One way to update the sequence value is to increment it by a predetermined increment value. The predetermined time interval is a time, for example, 5 seconds, in which a heartbeat message must be sent and received. If a valid heartbeat message is sent and received within the predetermined time interval, then the time in which to receive the next heartbeat message is extended by a time equal to the predetermined time interval, which in this example is 5 seconds. Both the SSAdmin and the SSAgent maintain synchronized timers that are used to determine whether the heartbeat messages are received within the predetermined time intervals. The predetermined sequence value and time interval are used to distinguish the real storage client from a counterfeit storage client.

The heartbeat message is part of a monitoring process in which a computer, such as storage server 122, must periodically receive a heartbeat message from an entity, such as storage client 104, to indicate that storage client 104 is present and to continue to allow the requests sent by storage client 104 to be serviced. If storage server 122 does not receive a heartbeat message within the predetermined time interval, requests (e.g., requests to send (write) or receive (read) data) from storage client 104 will no longer be accepted, until the next authentication. This process protects storage server 122 from sending data out onto communications system 130 and to a masquerading computer, in the event that storage client 104 is no longer functional or becomes disconnected. Example requests are read or write commands to storage server 122 to read data from or write data to the storage device 116.

Continuing with the illustrative example, the SSAdmin receives authentication and heartbeat messages from the SSAgent in storage client 104. The SSAdmin negotiates the authentication process and manages the monitoring of the heartbeat messages from all of the storage clients which would like to utilize storage server 122. The SSAdmin maintains a list of all the valid storage clients and their security information. It should be realized that the SSAdmin can maintain and service multiple storage clients.

The SSAdmin instructs storage server 122 to continue to service requests from storage client 104 for as long as valid heartbeat messages are received within the predetermined time interval. Service will be halted when storage client 104 either intentionally ends its connection or when a valid heartbeat message fails to be received by storage server 122 within the predetermined time interval. If an invalid or unknown heartbeat message is received by storage server 122, the invalid or unknown heartbeat message is ignored. When the predetermined time interval expires, the time to receive the next message is not extended and the SSAdmin instructs storage server 122 to discontinue servicing requests from storage client 104. If, in the case above, a valid heartbeat message is sent after the invalid or unknown heartbeat message, but before the predetermined time interval expires, then the SSAdmin instructs storage server 122 to continue servicing requests from storage client 104, and the time to receive the next heartbeat message is extended by a time equal to the predetermined time interval. If a valid heartbeat message is received within the predetermined time interval, the SSAdmin instructs storage server 122 to continue servicing requests from storage client 104, and the time to receive the next heartbeat message is extended by a time equal to the predetermined time interval. If a valid heartbeat message is not received within the predetermined time interval, then the time to receive the next heartbeat message is not extended and the SSAdmin instructs storage server 122 to discontinue servicing requests from storage client 104. If an invalid or unknown heartbeat message is received by storage server 122, and another valid heartbeat message is not received within the predetermined time interval, then the SSAdmin instructs storage server 122 to discontinue servicing requests from storage client 104. Only a valid message within the predetermined time interval can trigger the SSAdmin to extend the timer to the next time interval, and therefore maintain servicing requests.

Operationally, before the SSAgent and the SSAdmin engage in an authentication process, they need preestablished authentication information. A shared secret is established in both the SSAdmin and the SSAgent. Using processes and techniques known within the art of cryptography, a shared secret can be distributed to the SSAgent and SSAdmin either manually by a person or through a key exchange protocol, such as Diffie-Hellman.

The shared secret is securely stored in storage client 104 and storage server 122 in a manner to prevent and discourage individuals from determining the shared secret's identity. Each storage client, for example storage clients 104-110, is given its own individual shared secret to enhance the security level of storage area network 102.

Continuing the illustration, an authentication handshake process begins by establishing a secure session between the SSAgent in storage client 104 and SSAdmin in storage server 122. The SSAgent instructs storage client 104 to perform a standard challenge-response protocol using the shared secret with the SSAdmin. During this process a session key is generated, a sequence value is determined, an increment value is determined, and an identifier (e.g., IP address) associated with storage client 104 is stored in a table in memory. This information is stored in a table for the purpose of maintaining the session keys, sequence values, and increment values for multiple storage clients 104-110. It should be noted that the increment value can be predetermined and embedded as part of the SSAdmin and SSAgent software. In this illustration, the sequence value is randomly generated by SSAdmin and shared with SSAgent during the authentication process. It should be realized that one skilled in the art could arrange for the sequence value to be generated by SSAgent. The session key and the sequence value, along with any other necessary information will be used in subsequent heartbeat messages, which are described in more detail below. Once the SSAdmin validates the identity of storage client 104 by the authentication process, the SSAdmin instructs the storage server 122 to service requests from storage client 104. It should be realized that other storage clients and/or multiple storage clients may be used, such as storage clients 106-110 or more, and that they can interact with various storage devices, such as intelligent storage devices 112, 114, and/or storage device 118 via storage server 120.

Figure 2:
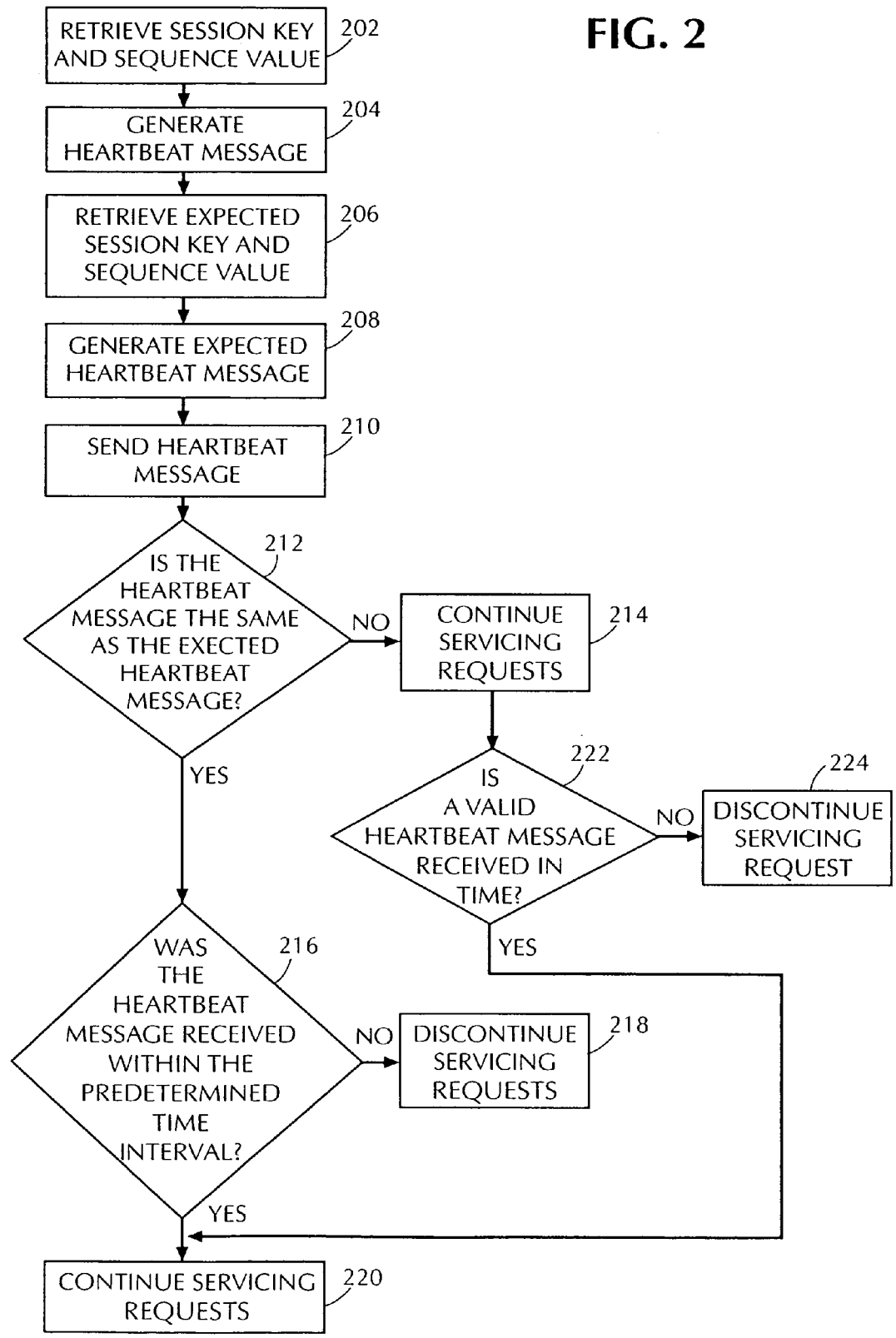
FIG. 2 shows a flow chart of a process carried out in a storage client and a storage server.

FIG. 2 illustrates an exemplary heartbeat process using, for example, storage server 122 and storage client 104. At block 202 the SSAgent instructs storage client 104 to retrieve the session key and the agreed upon sequence value for use in creating a heartbeat message. SSAdmin instructs storage server 122 to update (e.g., by a predetermined increment value) the sequence value to a new value after it is determined that a valid heartbeat message was received and to send an acknowledgment message to the SSAgent in storage client 104. Upon receipt of the acknowledgment message SSAgent instructs storage client 104 to update its sequence value. Because heartbeat messages are unique to every storage client, the identity of storage client 104 is revalidated after each heartbeat message is received. The sequence values are known only between storage server 122 and storage client 104.

At block 204, the SSAgent instructs storage client 104 to process the session key and the sequence value through a one-way hash function (algorithm) to generate a hash value of the heartbeat message that is going to be sent to the SSAdmin in storage server 122. It should be realized that the information that comprises a heartbeat message can be any type of information so long as the information satisfies security and uniqueness requirements. In this illustration, the one-way hash algorithm is preferably Message-Digest Hash Function 5 (MD5), but other algorithms, such as Secure Hash Algorithm (SHA-1), can be used. MD5 is a digital signature algorithm that is used to verify data integrity through the creation of a 128-bit message digest from data input, which may be a message of any length.

The SSAdmin, at block 206, instructs storage server 122 to retrieve the session key and sequence value, which it expects to receive from storage client 104. To determine which session key, sequence value, and increment value to retrieve, the SSAdmin receives an identifier (e.g., IP address) from the SSAgent, searches the table for a similar identifier, and associates the identifier with the session key and sequence value established during authentication. The SSAdmin instructs storage server 122, at block 208, to process the session key and sequence value through a one-way hash algorithm to generate a hashed value of an expected heartbeat message. If the storage client 104 is the client that was authenticated earlier, then the expected heartbeat message should be the same as the heartbeat message generated by storage client 104 at block 204. It should be realized that blocks 202-204 and blocks 206-208 can be performed as parallel operations.

Alternatively, SSAdmin can instruct storage server 122 to process the session key and sequence value for each storage client 104-110 through a one-way hash algorithm and store the results (expected heartbeat message) in the table. Thus, when comparing the expected heartbeat message to the received heartbeat message, SSAdmin can instruct storage server 122 to read the identifier and search the table for the expected heartbeat message, before comparing the messages to each other.

While storage client 104 sends requests to storage server 122 and storage server 122 services the requests, the SSAgent, at block 210, instructs storage client 104 to send the heartbeat message to storage server 122 over communications system 130. Storage server 122 receives the heartbeat message from storage client 104 and, at block 212, SSAdmin instructs storage server 122 to compare the heartbeat message from storage client 104 to the expected heartbeat message generated at block 210. If the heartbeat messages are not the same they are considered invalid or unknown and, at block 214, SSAdmin instructs storage server 122 to continue servicing requests. If, at block 222, a valid heartbeat message is not received within the predetermined time interval, the SSAdmin instructs storage server 122, at block 224, to discontinue servicing any more requests from the SSAgent at storage client 104. If a valid message is received within the predetermined time interval, the SSAdmin instructs storage server 122 to continue servicing requests, at block 220. Further, SSAdmin can instruct storage server 122 to generate and send a message to storage client 104 requesting that the heartbeat message be resent. SSAdmin can also instruct storage server 122 to generate and send a warning signal, such as "Possible Intruder," to the display of storage server 122 if invalid or unknown heartbeat messages are received. It should be realized that the amount of data that may be sent to a masquerading computer or unauthorized computer depends upon how quickly storage server 122 detects the masquerading or unauthorized computer, which further depends upon the time interval within which heartbeat messages are sent. Using a short time interval will result in quicker detection than using a long time interval.

If, at block 212, the heartbeat messages are the same, the SSAdmin instructs storage server 122, at block 216, to determine whether the heartbeat message from storage client 104 was received by storage server 122 within a predetermined time interval. If the heartbeat message was not received within the predetermined time interval, at block 218, SSAdmin instructs storage server 122 to stop servicing requests from storage client 104. If the heartbeat message was received within the predetermined time interval, the SSAdmin, at block 220, instructs storage server 122 to continue servicing the requests from storage client 104.

The above presents various principles and features of the invention through descriptions of various embodiments. It is understood that skilled artisans can make various changes and modifications to the embodiments without departing from the spirit and scope of this invention. For example, one of ordinary skill in the art would recognize that, although the invention has been described by reference to a client-server relationship, an alternative embodiment of the invention can utilize a peer-to-peer relationship. Thus, one of ordinary skill in the art would understand that the invention is not to be limited by the foregoing illustrative details, but rather is to be defined by the following claims.

We claim:

1. A method to protect stored data, comprising:
performing one or more times, by a processor, the following actions:
receiving from a device verification information generated using common information known to the device and to the processor;
verifying the validity of the verification information using the common information;
determining an authorization status of the device based on (1) the validity of the verification information and (2) the time the verification information is received by the processor; and
receiving a request from the device to access the stored data; and
allowing the device to access the stored data based on the authorization status at the time the request is received.

2. The method of claim 1, comprising:
determining an authorization status of the device based on (1) the validity of the verification information and (2) whether the verification information is received during a predetermined time interval.

3. The method of claim 1, further comprising:
updating the common information; and
instructing the device to update the common information.

4. The method of claim 1, comprising establishing an initial authorization status of the device based on a predefined authentication process.

5. The method of claim 1, wherein the common information comprises a sequence value.

6. The method of claim 5, wherein the common information further comprises a session key.

7. The method of claim 6, wherein the verification information comprises a verification value.

8. The method of claim 7, further comprising:
updating the sequence value according to a first predetermined algorithm to generate an updated value;
applying a second predetermined algorithm to the updated value to generate an expected value;
comparing the expected value to the verification value; and
determining the verification value to be valid if the expected value is the same as the verification value.

9. The method of claim 8, wherein the first predetermined algorithm comprises updating the stored value by a predetermined increment value.

10. The method of claim 9, wherein the second predetermined algorithm comprises applying a hash function to the updated value and the session key to generate the expected value.

11. The method of claim 10, wherein the hash function comprises a Message-Digest Hash Function 5 (MD5) algorithm.

12. The method of claim 9, comprising:
retrieving an expected value from a table;
comparing the verification value to the expected value; and
determining the validity of the verification value based on the comparison.

13. The method of claim 1, wherein the verification information comprises a session key and a sequence number.

14. A method to protect stored data, comprising:
providing authentication information to a processor responsible for managing data processing requests relating to stored data;
performing, at least once during one or more time intervals having predetermined durations, the following actions:
retrieving from memory a value previously received from the processor;
receiving an acknowledgment message from the processor;
in response to the acknowledgment message, updating the value according to a first predetermined algorithm to generate an updated value;
applying a second predetermined algorithm to the updated value to generate an encoded value; and
transmitting the encoded value to the processor; and
transmitting to the processor at least one data processing request relating to the stored data.

15. The method of claim 14, wherein the first predetermined algorithm comprises updating the value by a predetermined increment value.

16. The method of claim 14, wherein the second predetermined algorithm comprises encoding the updated value using a session key previously provided by the processor.

17. The method of claim 16, wherein the second predetermined algorithm comprises a hash function.

18. The method of claim 17, wherein the hash function comprises a Message-Digest Hash Function 5 (MD5) algorithm.

* * * * *